USOO8629188B2

(12) United States Patent
Ravikumar et al.

(10) Patent No.: US 8,629,188 B2
(45) Date of Patent: Jan. 14, 2014

(54) CARBON NEUTRAL NATURAL GAS TO LIQUIDS PLANT WITH BIOMASS CO-FEED

(71) Applicant: Fluor Technologies Corporation, Aliso Viejo, CA (US)

(72) Inventors: Ravi Ravikumar, Lancaster, CA (US); Brian DeSousa, Orange, CA (US)

(73) Assignee: Fluor Technologies Corporation, Aliso Viejo, CA (US)

( * ) Notice: Subject to any disclaimer, the term of this patent is extended or adjusted under 35 U.S.C. 154(b) by 0 days.

(21) Appl. No.: 13/624,699

(22) Filed: Sep. 21, 2012

(65) Prior Publication Data

US 2013/0079426 A1 Mar. 28, 2013

Related U.S. Application Data

(60) Provisional application No. 61/538,502, filed on Sep. 23, 2011.

(51) Int. Cl.
*C07C 27/00* (2006.01)

(52) U.S. Cl.
USPC ............ 518/700; 518/702; 518/704; 518/705

(58) Field of Classification Search
USPC ................................. 518/700, 702, 704, 705
See application file for complete search history.

(56) References Cited

U.S. PATENT DOCUMENTS

| 2002/0016375 A1 | 2/2002 | Iijima et al. |
| 2003/0014974 A1 | 1/2003 | Rojey et al. |
| 2003/0203983 A1 | 10/2003 | O'Rear et al. |
| 2004/0244289 A1 | 12/2004 | Morozumi et al. |
| 2004/0248999 A1 | 12/2004 | Briscoe et al. |
| 2007/0011945 A1* | 1/2007 | Grootveld et al. .......... 48/197 R |
| 2008/0098654 A1 | 5/2008 | Cherry et al. |
| 2010/0018217 A1 | 1/2010 | Boshoff et al. |
| 2010/0285576 A1 | 11/2010 | Norbeck et al. |
| 2010/0286292 A1 | 11/2010 | Wix |
| 2011/0054231 A1 | 3/2011 | Peterson |

FOREIGN PATENT DOCUMENTS

WO  2011-066074 A2  6/2011

OTHER PUBLICATIONS

Guettel, R. et al., "Reactors for Fischer-Tropsch Synthesis", Chemical Engineering Technology, 2008, vol. 31, No. 5, pp. 746-754.
Patent Cooperation Treaty, "Notification of Transmittal of the International Search Report and the Written Opinion of the International Searching Authority, or the Declaration", PCT Application No. PCT/US12/56713, issued Mar. 22, 2012.

* cited by examiner

*Primary Examiner* — Jafar Parsa
(74) *Attorney, Agent, or Firm* — Fish & Associates, PC

(57) ABSTRACT

Configurations, systems, and methods for a gas-to-liquids plant are presented in which the energy demand for natural gas reformation is provided at least in part by biomass gasification to reduce or eliminate net carbon emissions. Preferred plants, systems, and methods may recycle various process streams to further reduce water demand, improve the hydrogen/carbon ratio of a feed stream to a Fischer-Tropsch process, and recover and/or recycle carbon dioxide.

10 Claims, 3 Drawing Sheets

CARBON NEUTRAL NATURAL GAS TO LIQUIDS PLANT WITH BIOMASS CO-FEED

This application claims the benefit of priority to U.S. Provisional Application with the Ser. No. 61/538,502, filed 23 Sep. 2011.

FIELD OF THE INVENTION

The field of the invention is gas processing, and especially biomass-assisted reformation of natural gas for Fischer-Tropsch processes.

BACKGROUND

High demand for transport fuels coupled with historically high costs for petroleum has led to an increased interest in alternative methods for producing such fuels. The Fischer-Tropsch process, which can produce hydrocarbons that may be used in the production of motor fuels from CO and $H_2$ containing syngas, is an attractive and proven method for use in such processes—provided that an inexpensive and clean source of syngas can be utilized. Fortunately in many areas, natural gas, often in the form of shale gas, is a readily available and inexpensive raw material that may be used to synthesize transport fuels. Conversion of natural gas (the primary component of which is methane or $CH_4$) to syngas, and hence to diesel fuel, jet fuel, or gasoline via Fischer-Tropsch processes is at least conceptually simple and has been implemented for many decades. An initial step in this process is the conversion of shale/natural gas to a syngas with a specific hydrogen to carbon ratio using a reformer, typically by steam reformation. The CO-containing syngas produced in this fashion can serve as a feed stream for a Fischer-Tropsch reactor that produce hydrocarbons suitable for use as fuel.

With all such synthetic processes, however, both yield and generation of undesirable waste products are a concern. In particular, the $CO_2$ emissions from the production of motor or hydrocarbon fuels from natural gas are a factor that makes these processes non-competitive with conventional petroleum fractionation in modern refineries.

A number of methods for capturing a portion of the $CO_2$ produced in Fischer-Tropsch syntheses have been proposed to attempt to address this issue. Such captured $CO_2$ may be sequestered or may be reutilized. $CO_2$ may be extracted from the output of the Fischer-Tropsch reactor and sequestered, as disclosed in U.S. Pat. App. No. 2003/203983 and U.S. Pat. App. No. 2010/0018217; while this avoids immediate release of the $CO_2$ to the atmosphere, establishing and monitoring such sequestration operations is not without expense. Alternatively, a portion of the $CO_2$ may be recovered from the output of a Fischer-Tropsch reactor and subjected to a reverse water gas shift reaction in a separate reactor in order to produce a secondary CO-containing feed stream, which is directed back to the Fischer-Tropsch reactor (as described in U.S. Pat. App. No. 2003/014974), albeit at the expense of an additional processing unit. Captured $CO_2$ may also be directed to an alternative reactor or facility to generate additional products such methanol and methanol derivatives, as described in U.S. Pat. App. No. 2004/248999, however depending on the nature of these products and how they are utilized, this may still result in a net release of $CO_2$ to the environment.

Another source of $CO_2$ in the production of fuel hydrocarbons from natural gas is the reformer. The primary reaction carried out in steam reformation of methane is $CH_4 + H_2O \rightarrow CO + 3H_2$; the reaction is strongly endothermic, with a standard formation enthalpy of +206 kJ/mol. Industrially, this process is generally carried out at a temperature of over 700° C. to ensure an adequate reaction rate. Since the primary reaction is endothermic, heat needs to be supplied to the reformer in order to maintain the required temperature. Typically, such reformers are equipped with burners that supply the necessary heat by utilizing a portion of the $CH_4$ containing feed stream or of the syngas intermediate produced by the reformer itself as fuel. Unfortunately, in addition to being a significant source of $CO_2$ emissions, this directly impacts the overall efficiency of the process by nonproductive loss of raw or intermediate materials. U.S. Pat. App. No. 2002/016375 discloses a system for producing syngas from natural gas using a reformer that increases overall efficiency by utilizing burners supplied by an external fuel source, such as a separate source of natural gas maintained for this purpose. $CO_2$ from combustion of fuel at these burners is captured and directed to the reformer. However such $CO_2$ capture processes are energy intensive and are unlikely to be completely effective in eliminating $CO_2$ emissions from this source.

Alternative sources of syngas that reduce overall $CO_2$ emissions while utilizing the economy provided by the use of fossil fuels through incorporation of biological fuel components as raw materials have been suggested. For example, U.S. Pat. App. No. 2010/0285576 describes a method that processes a slurry of coal and algae through steam hydrogasification in a gasifier to produce a $CH_4$ rich feed stock that may be used to produce syngas, with $CO_2$ recovered from subsequent processes utilized in cultivation of the algae. Unfortunately not only would a plant utilizing such technology would require an extensive algae cultivation facility, locations where such plants could be constructed would be limited by climate and latitude. In addition, it is unclear to what extent such recaptured $CO_2$ would be incorporated into algal biomass.

These and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

Thus, even though various processes are known in the art to produce a feed stream for a Fischer-Tropsch process, there is still a need for improved plant configurations and processes to do so in an ecologically and economically attractive manner.

SUMMARY OF THE INVENTION

The inventive subject matter provides plant configurations, systems, and methods in which natural gas reformation is assisted with biomass gasification such that the fuel gas product from the biomass gasification is used as a renewable reformer fuel to thereby significantly reduce or eliminate net plant carbon emissions. Moreover, contemplated plants, systems and methods may recycle various process streams to further reduce steam demand, improve the hydrogen to carbon ratio of the feed stream to the Fischer-Tropsch process, and reduce or eliminate aqueous waste processing. In especially preferred aspects, at least some of the $CO_2$ from the reformed natural gas is recovered and recycled, thereby further reducing $CO_2$ emissions from the plant.

Various objects, features, aspects and advantages of the inventive subject matter will become more apparent from the following detailed description of preferred embodiments, along with the accompanying figures in which like numerals represent like components.

DETAILED DESCRIPTION

The inventive subject matter provides plant configurations, systems, and methods in which natural gas reformation is assisted with biomass gasification such that a fuel gas generated from gasification of biomass is utilized as a carbon-neutral, renewable reformer burner fuel to significantly reduce or eliminate net plant carbon emissions. Moreover, contemplated plants, systems and methods recycle various process streams to further reduce steam/water demand, to improve the hydrogen/carbon ratio of the feed stream to the Fischer-Tropsch process, and to reduce or eliminate aqueous waste processing. In especially preferred aspects, $CO_2$ from the reformed natural gas is recovered and recycled, further reducing $CO_2$ emissions from the plant.

It should appreciated that the disclosed methods and devices provide many advantageous technical effects including advantageously improving the yield of fuel products synthesized from natural gas or similar sources via a Fischer-Tropsch reaction while reducing or eliminating net $CO_2$ emissions from the process.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Figure 1:
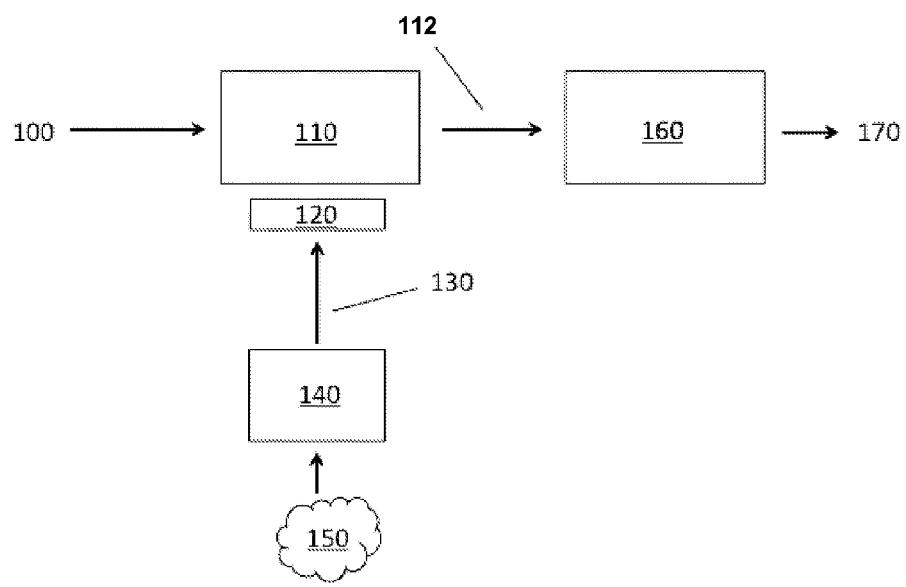
FIG. 1 is a schematic of an exemplary process according to the inventive subject matter in which biomass gasification provides a carbon-neutral source of gas fuel for heating a natural gas reformer.

One aspect of the inventive concept, shown in FIG. 1, depicts a process for conversion of natural gas and/or shale gas to fuel products in a gas-to-liquids plant that utilizes two sources of carbonaceous materials. A first carbonaceous 100, which is preferably a gas containing methane ($CH_4$), is directed to a reformer 110. In a preferred embodiment, the reformer 110 is a tubular reformer. The first feed stream 100 can be natural gas and/or shale gas, although other methane containing gaseous feed stocks (such as, for example, methane recovered from methane hydrates, landfills, and digestion of biomass) are also contemplated. Within the reformer 110, $CH_4$ is reacted with water at elevated temperatures to form a syngas containing CO and $H_2$. As noted above this process is endothermic. As a result, temperatures within the reformer would drop below acceptable levels if an external source of heat were not provided. To accommodate this, the reformer 110 is provided with one or more burners 120. Fuel for the burner(s) 120 is provided by processing of a second carbonaceous feed stream in the form of biomass 150, which is subjected to biomass gasification in a gasification reactor 140. This advantageously improves the efficiency of the overall fuel synthesis reaction relative to processes that divert a portion of the syngas or methane containing feed stock for use as burner fuel. The gasification reactor 140 may be an updraft reactor, a downdraft reactor, or a crossdraft reactor, and may utilize a fixed or fluid reaction bed. Within the gasification reactor incomplete combustion of carbon in the biomass produces a combustible fuel gas containing CO and $H_2$. In a preferred embodiment of the inventive concept, oxygen is provided to the gasification reactor 140 in the form of air. In such an embodiment the resulting fuel gas is substantially diluted with noncombustible $N_2$ (A. K. Rajvanshi, "Biomass Gasification", in *Alternative Energy in Agriculture*, Vol. II, Ed. D. Yogi Goswami, CRC Press, 1986, pgs. 83-102). As such its utility as a feed stock is limited, however it is highly suitable as a fuel source for direct heat. The fuel gas 130 is directed to the burner(s) 120, where combustion provides heat for reformer 110. This combustion produces $CO_2$, however since the carbon originates from renewable biological sources rather than a sequestered source (i.e. a fossil fuel) the process is considered carbon-neutral, with no net emission release of $CO_2$ to the environment. Suitable sources of biomass include (but are not limited to) wood, wheat straw, corn cobs, rice hulls, pressed sugar cane, rice husks, and cotton stalks. This advantageously reduces release of $CO_2$ to the environment compared to processes that utilize fossil fuels or fossil fuel derivatives as burner fuel. It is also notable that many suitable biomass sources are agricultural waste products, and that utilization of such materials advantageously does not divert resources from the production of food crops. Following processing in the reformer 110, syngas 112 is directed to a fuel synthesis unit 160. In a preferred embodiment of the inventive subject matter, the fuel synthesis unit can include a Fischer-Tropsch reactor or a methanol plant. Processing of the syngas feed 112 in the fuel synthesis unit 160 yields a fuel product 170.

Figure 2:
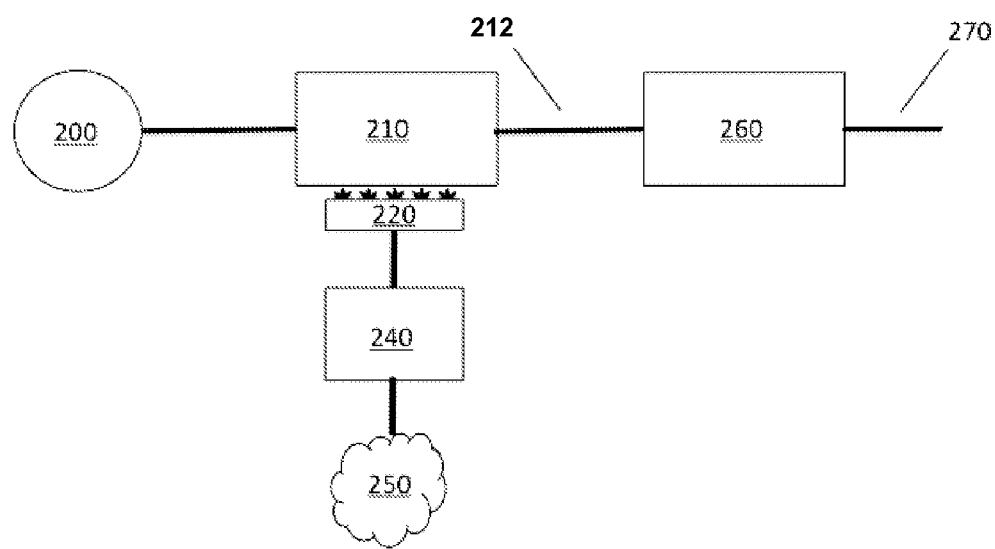
FIG. 2 is schematic of an exemplary plant according to the inventive subject matter.

Another aspect of the inventive concept is shown in FIG. 2, which schematically depicts an exemplary gas-to-liquids plant that utilizes two sources of carbonaceous materials to process natural gas or shale gas into fuel products. A first carbonaceous feed stream source 200 is provided, which provides a gas containing methane ($CH_4$) that is directed to a reformer 210 that includes one or more burners 220. In a preferred embodiment the reformer 210 is a tubular reformer. The first feed stream can be natural gas and/or shale gas, although other methane containing gaseous feed stocks (such as, for example, methane recovered from methane hydrates, landfills, and digestion of biomass) are also contemplated. The burner(s) 220 provide an external source of heat for the reformer 210 that supports the methane reformation reaction described above. Fuel for the burner(s) 220 is provided by processing material of a second carbonaceous feed source 250, typically biomass, which is subjected to biomass gasification on transfer to a gasification reactor 240. Suitable sources of biomass include (but are not limited to) wood, wheat straw, corn cobs, rice hulls, pressed sugar cane, rice husks, and cotton stalks. It is notable that many of these are agricultural waste products, and that utilization of such materials advantageously does not divert resources from the production of food crops. The gasification reactor 240 may be an updraft reactor, a downdraft reactor, or a crossdraft reactor, and may utilize fixed bed or fluidized bed designs. Within the gasification reactor 240 carbon from the biomass is reacted with oxygen to generate a combustible fuel gas. In a preferred embodiment of the inventive concept, oxygen is provided to the gasification reactor 240 in the form of air, although the use of purified or partially purified oxygen is also contemplated. The fuel gas is directed to the burner(s) 220, where combustion provides heat for reformer 210. This combustion produces $CO_2$, however since the carbon originates from renewable biological sources rather than a sequestered source (i.e. a fossil fuel) the process is considered carbon-neutral, with no net emission release of $CO_2$ to the environment. Syngas produced in the reformer 210, syngas is directed via a syngas supply line 212 to a fuel synthesis unit 260. In a preferred embodiment of the invention the fuel synthesis unit 260 can include a Fischer-Tropsch reactor or a methanol plant. Products are removed from the fuel synthesis unit 260 via a fuel product line 270 for further processing or for use as motor fuel.

Figure 3:
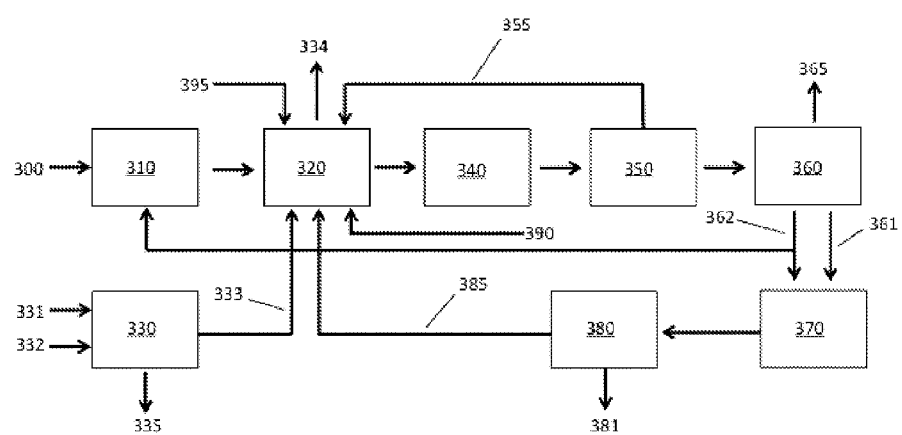
FIG. 3 is a diagram of an exemplary process according to the inventive subject matter in which biomass gasification provides a carbon-neutral source of gas fuel for heating a natural gas reformer, and in which additional efficiencies are realized by utilizing product streams of the Fischer-Tropsch reaction in the natural gas reformer and to generate power.

While advantages above embodiments include reduction improved efficiency in the utilization of fossil fuel resources and reduced release of $CO_2$ to the environment, further efficiencies and advantages may be realized by redirecting and/or reutilizing various products of the described processes. In a particularly preferred aspect of the inventive subject matter, as shown in the schematic of FIG. 3, an exemplary gas-to-liquids plant has two sources of carbonaceous material. The first source can be a source of natural gas 300 (or other source of volatile hydrocarbon, such as $CH_4$) and the second source is a source of biomass 331. Most preferably, the natural gas from the first source 300 is fed to reformer saturator 310 to produce a saturated feed that is routed to the (typically tubular) reformer 320, which produces an unprocessed syngas. Reformer effluent will typically be syngas containing $H_2$, CO, $CO_2$ and small amount of $CH_4$. In less preferred aspects, however, at least partially shifted syngas is also contemplated as $CO_2$ may be removed, at least in part, in a downstream process. The reformer effluent may then be cooled in cooler 340 and $CO_2$ removed in $CO_2$ removal unit 350. $CO_2$ may be recovered from the cooled syngas in a variety of manners, and it is generally contemplated that all known $CO_2$ removal methods are deemed suitable for use herein. For example, $CO_2$ can be removed in a solvent-based process after cooling the reformer effluent or by using pressure swing adsorption, membrane processing, adsorbents, or any suitable technology. Alternatively, hot $CO_2$ removal from non-cooled syngas is also contemplated; especially suitable methods include membrane filtration. The removed $CO_2$, may be recycled via recycle line as stream 355 to the reformer 320 to advantageously further decrease $CO_2$ emissions while optimizing the hydrogen to carbon ratio of the syngas feed stream to a Fischer-Tropsch unit 360. A Fischer-Tropsch unit (or, alternatively, a syngas to methanol unit) 360 then produces hydrocarbon liquids 365 that are utilized to produce liquid fuel. This process generates additional product streams, which may be utilized for further processing as detailed below.

To support operation of the reformer 320, biomass may be gasified using conventional air blown gasification technology to provide a fuel gas 333 for use in heating the reformer 310, thus avoiding the use of expensive purified $O_2$. As noted above, the reformer 320 may be of any suitable design, including updraft, downdraft, solid bed, fluidized bed, and crossdraft configurations, as is suitable for the nature of the biomass to be utilized and the space and demand requirements of the plant. Such gasification technologies provide combustible gas mixtures with significant $N_2$ content that, while they may not be suitable for utilization in Fischer-Tropsch synthesis, may be burned to provide heat. Limestone 332 or similar reactive materials may also be provided to the gasifier 330 in order capture sulfurous compounds present in the biomass 331 as a solid byproduct 335. Sulfur is captured primarily in the form of calcium sulfite, which can be sold as building material, and advantageously reduce or even eliminate the need for desulfurization of flue gas 334 generated by burners associated with the reformer 320. Operation of the reformer is particularly economical and $CO_2$ neutral where the biomass gasification is performed using a tubular reformer equipped with an atmospheric circulating fluid bed system, with limestone addition for sulfur removal from the bed as calcium sulfite that is a saleable building material such that the products of combustion at the reformer burner(s) do not require desulfurization. It should be particularly appreciated that use of such a supplemental fuel source significantly reduces the carbon footprint of this process relative to heretofore known reformer configurations that utilize methane-containing feed stock and/or reformer effluent as a source of burner fuel, as the use of biomass is carbon neutral.

It should be noted that direct use of biomass derived materials as syngas has been proposed. Use of such synthesis gas, however, requires compression and extensive and expensive gas treatment. Such processes also generally require the use of expensive purified $O_2$ as a source of oxygen for the biomass gasifier in order to avoid $N_2$ dilution of the syngas, which can lead to the need for large Fischer-Tropsch installations. Utilization of an air blown biomass gasifier to produce a fuel gas used as reformer fuel gas in the configurations and methods of FIG. 3 avoids these costly processing steps.

Moreover, it should also be appreciated that the waste streams from the Fischer-Tropsch unit can be redirected and re-used advantageously in embodiments of the inventive concept. Water or steam 362 formed in a Fischer-Tropsch process 360 (or a methanol to gasoline process) may be employed to saturate a natural gas feed 300 in saturator 310, providing at least a portion of the water consumed in the reformation process and reducing the steam demand in the reformer 320. Such recycling may reduce or eliminate the need for provision of external water or steam 395 to the reformer 320. Additionally, or alternatively, water or steam 362 from the Fischer-Tropsch or methanol unit 360 can also be used to saturate hydrogen containing waste gas 361 that originates from a Fischer-Tropsch or methanol unit 360, thereby providing motive fluid in a gas turbine 380 where the hydrogen containing waste or purge gas 361 is saturated in saturator 370 and used as a saturated fuel. Such a turbine 380 may be utilized to generate power 381 that can be utilized to support operations of the plant or distributed throughout the local power grid. It should be further noted that hot turbine exhaust gasses 385 may be employed as combustion air in the burners used to heat the reformer 320, which may also be supplemented with fresh preheated air 390 to reduce the energy demands of the reformer. Fresh air 390 may, for example, be preheated by heat exchange with exhaust gases generated by the reformer burner(s) 334. This and similar heat exchanges may be accomplished utilizing counterflow heat exchangers, heat pipes, heat pumps, and other suitable devices.

With respect to the first feed stream it should be appreciated that numerous sources other than natural gas are also deemed suitable. Preferred alternative sources include at least partially processed shale gas, raw or at least partially processed natural gas from gas wells or from co-produced gas, methane hydrates, pipeline gas, processed gas streams from hydrocarbon refining, etc., provided that such a source provides satisfactory quantities of gaseous hydrocarbon products. Thus, suitable hydrocarbons found in the first feed stream will typically include methane, ethane, ethane, propane and propylene, etc. Similarly, it should be noted that the nature of the second feed stream may vary considerably. In the broadest terms, the biomass that comprises the second feed stream may be any biological material from a living, or recently living organism or organisms. In addition to the agricultural waste materials noted above, biomass may include lignocellulosic materials, algae materials, raw or partially processed plant matter, processed animal wastes, biosolids, and so on.

Thus, it should be recognized that recycling of various process streams can be used to effectively reduce the energy and water/steam demands of a process or plant of the inventive concept, while the utilization of biomass to fuel a reformer coupled with recycling of $CO_2$ reduces net $CO_2$ emissions and adjusts the hydrogen/carbon ratio of the syngas intermediate to a desirable range. Recycling of the process water also advantageously reduces (and typically eliminates) the need to purify a process stream that otherwise could not be discharged into the environment due to presence of contaminating oxygenates that would require extensive treatment for removal. Furthermore, recovery of $CO_2$ from the syngas intermediate and recycling to the reformer feed decreases the $H_2/CO$ ratio of the syngas intermediate utilized in the downstream Fischer-Tropsch (or methanol plant, as a precursor for a methanol to gasoline plant) to a desirable range while also minimizing $CO_2$ emissions in a gas turbine exhaust when the $H_2$ rich purge gas is used as gas turbine fuel. It should further be appreciated that all Fischer-Tropsch units and related processes in which carbon-carbon bonds (and in some cases also carbon-oxygen bonds) are formed are contemplated for use herein. Consequently, it should be appreciated that plants and methods provided herein can operate in a carbon neutral manner that cannot be achieved in conventional gas-to-liquid plants.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of producing a fuel product, comprising:
   providing a first feed stream to a reformer unit to produce a reformed product stream, the first feed stream comprising a volatile hydrocarbon;
   providing a second feed stream to a gasification reactor to produce a fuel gas, the second feed stream comprising a biomass; and
   wherein at least a portion of the fuel gas is utilized in a burner of the reformer unit and at least a portion of the reformed product stream is directed to a fuel synthesis unit that produces a synthesis unit product stream, the synthesis unit product stream comprising a fuel product.

2. The method of claim 1 wherein the first feed stream is selected from the group consisting of natural gas and at least partially processed shale gas.

3. The method of claim 1, wherein the fuel product is a liquid fuel suitable for use in an internal combustion engine.

4. The method of claim 1, wherein the fuel synthesis unit utilizes comprises a Fischer-Tropsch reactor.

5. The method of claim 1, wherein the fuel synthesis unit comprises a methanol plant.

6. The method of claim 1, wherein the reformed product stream comprises CO2, and wherein at least a portion of the CO2 of the reformed product stream is recovered and directed to the reformer unit.

7. The method of claim 1, wherein the synthesis unit product stream further comprises a water containing waste stream and a purge stream.

8. The method of claim 7, wherein at least a portion of the water containing waste stream of the synthesis unit product stream is combined with the first feed stream.

9. The method of claim 7, wherein at least a portion of the water containing waste stream is combined with the purge stream.

10. The method of claim 7, wherein at least a portion of the purge stream is utilized as fuel in a turbine thereby generating a turbine exhaust, and wherein at least a portion of the turbine exhaust is directed to the reformer unit.

* * * * *